INVENTOR.
SEYMOUR LOWELL
BY
John F. Ohlandt
ATTORNEY ns3,555,912
Patented Jan. 19, 1971

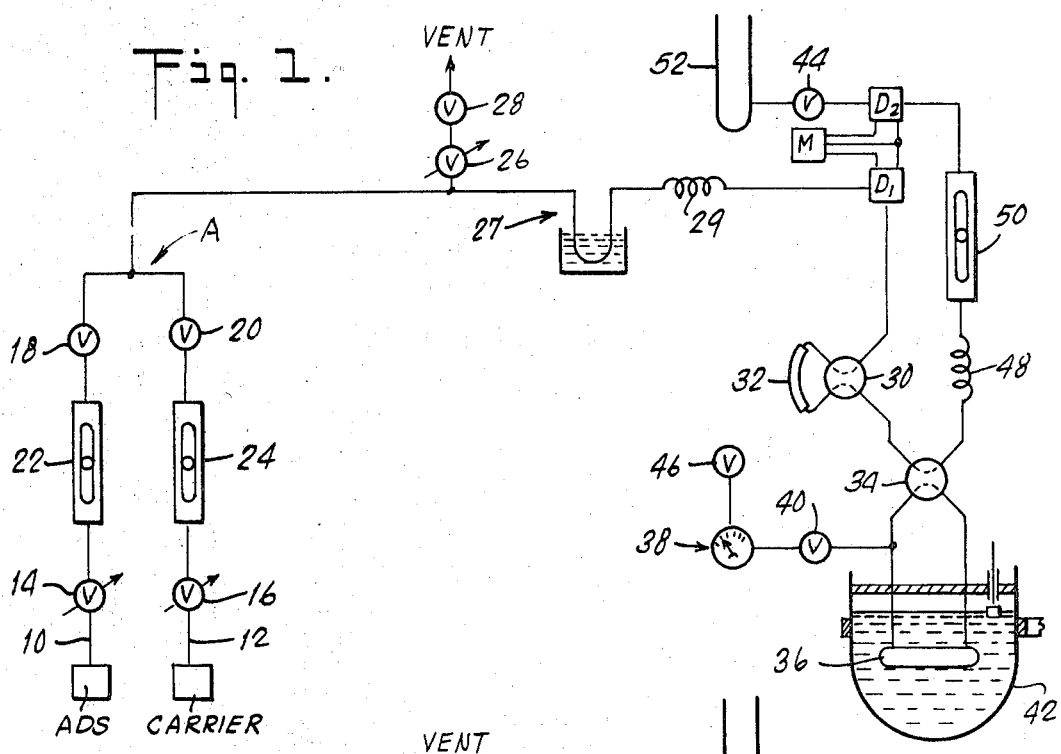

3,555,912
INCREMENTAL METHOD FOR SURFACE AREA AND PORE SIZE DETERMINATION
Seymour Lowell, Albertson, N.Y., assignor to Quantachrome Corporation, Greenvale, N.Y., a corporation of New York
Filed Aug. 4, 1969, Ser. No. 847,368
Int. Cl. G01n 15/08
U.S. Cl. 73—432                                                   2 Claims

ABSTRACT OF THE DISCLOSURE

An apparatus for precisely measuring the surface of solids, particularly those in particulate form. In essence, the measuring technique involves the flowing of two gases which are mixed in known proportions and are allowed to flow through a cooled sample cell containing a powder sample (adsorbent). One of the gases (adsorbate) is adsorbed on the powder and the resulting change in concentration is detected.

The improvement is characterized in that the relative pressure of the adsorbate is varied in slight increments whereby the entire isotherm can be obtained, but the variation is achieved by varying the flow rates of the individual gases while holding the total pressure always substantially at atmospheric.

BACKGROUND, SUMMARY AND OBJECTS OF THE INVENTION

This invention relates to an improvement in a method and apparatus for performing surface area measurements.

In order to provide some background for an understanding of the present invention, reference may be made to U.S. Pats. 2,960,870 and 3,211,006, the latter patent disclosing a system which is described as an improvement on the system of the former patent. In Pat. 3,211,006 there is disclosed a system for determining adsorption isotherms of solid material, which system involves the employment of pressures substantially above atmospheric. As a consequence, elaborate and complex high pressure equipment must be provided for controlling and withstanding said pressures, which are specified as extending up to 200 atmospheres (2940 pounds per square inch).

The system of the former patent, i.e. Pat. 2,960,870, does not require high pressures, but it is not capable of accurately determining the complete isotherm and cannot therefore be used for studies of pore sizes or adsorption hysteresis.

Thus it is manifest that the prior art has failed to recognize that a complete isotherm can be obtained at substantially atmospheric pressure. All previous designs have required either pressures significantly above or below atmospheric pressure, or they have failed to provide the capability of developing the entire adsorption isotherm.

Accordingly, it is a primary object of the present invention to achieve an economical system by which complete surface measurements can be made on solid materials.

Another object is to enable maintaining the total pressure of the system always substantially at atmospheric but allowing for development of the complete isotherm required.

The above objects are fulfilled and significantly improved results in accuracy of measurement obtained by the present invention. The approach taken in accordance with the technique of the present invention is predicated on the fact that the pressure of the adsorbate (such as nitrogen gas) is controllable by varying the individual flow rates of the adsorbate gas and the inert non-adsorbable carrier gas. Upon mixing of the two gases, the ratio of flow rates defines the ratio of pressures.

The prior art has been deterred from the above-described novel approach for constructing the entire adsorption isotherm. This is so because of the inherent difficulties presented when the relative pressure is to be varied by incremental changes in the flow rates of the two gases. The source of an extremely difficult problem has been the inability to discriminate, when the flow rates of the gases are being varied, between the change in concentration reflecting the amount of adsorbate adsorbed from the new concentration of gases by the powder sample in the cooled cell and the change due to the amount of the previous gas mixture of the old concentration which is being flushed out of the cell (the amount being flushed, as will become apparent is isolated from the main flow until the new concentration is established).

Briefly described, the technique of the present invention in its preferred form involves adsorbing the adsorbate from a flowing mixture of the carrier gas and adsorbate, while flushing from the sample cell a previous gas mixture having a slightly different concentration of the two gases; detecting the change in concentration resulting from such flushing of the cell; then, isolating the cell, establishing a new concentration of adsorbate in the flow, opening the cell and flushing out the former mixture while adsorbing adsorbate from the new mixture and detecting the resultant change in concentration. This procedure is repeated, using small incremental changes in adsorbate pressure, such that data can be obtained which will permit the entire adsorption isotherm to be constructed (adsorbate relative pressures from 0 up to 1). Then, by repeating this procedure while incrementally decreasing the adsorbate relative pressure, the isotherm can be reconstructed (at relative pressures from 1 down to 0) whereby any hysteresis present will be observed.

It should be especially noted that the above indicated steps are performed at substantially the same temperature for the sample cell. Moreover, the technique of the present invention involves varying the flow rates of the individual gases in the system in order to produce the incremental changes in relative pressure, but the total pressure of the system remains always substantially at atmospheric.

In carrying out the above-described procedures it is necessary to discriminate between that portion of the electrical signal corresponding to the change in concentration which is produced by flushing out the old mixture contained in the cell, and the portion of the signal due to adsorption of adsorbate from the new incoming mixture which is flushing out the cell. The unique provision for doing this, i.e. for separating the two portions or components of the signal, constitutes another important feature of the present invention, and will be explained in detail hereinafter.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 1 is a schematic diagram of one embodiment of apparatus for surface measurements.

FIG. 2 is a schematic diagram of another preferred embodiment.

DESCRIPTION OF PREFERRED EMBODIMENTS

Figure 3:
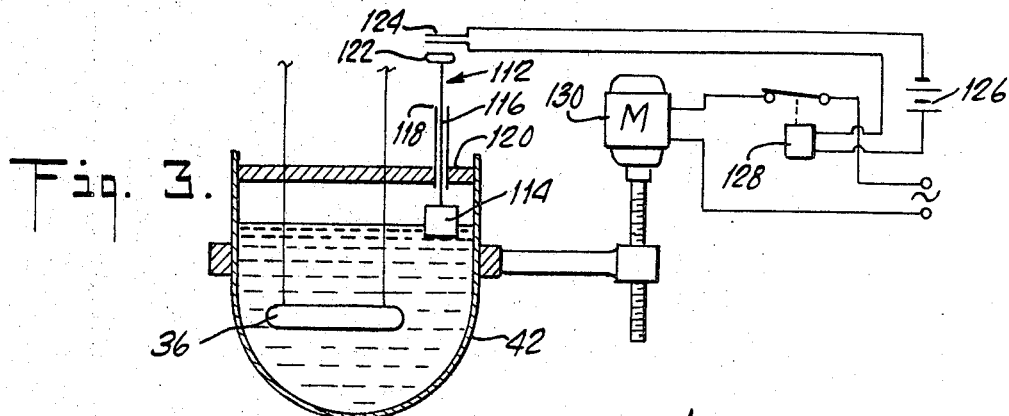
FIG. 3 is a schematic diagram illustrating the details of a level control mechanism for maintaining the level of the coolant relative to the sample cell.

Referring to FIG. 1, a first embodiment of apparatus for performing surface measurements is therein depicted. At the inlet or upsteam end of the system, the adsorbate and carrier gases are separately introduced into the lines 10 and 12 respectively. Needle valves 14 and 16 are used to control the individual gas flows while on-off valves 18 and 20 are used to start and stop the gas flows.

Flowmeters 22 and 24 in the respective lines 10 and 12 indicate the rates of flow. The gas flows merge at the T connection (point A) and a portion of the flow is diverted and vented to the atmosphere by way of the valves 26 and 28, valve 26 being operable to control the amount vented and, therefore, to control the flow rate through the remainder of the system. The gaseous mixture then flows through cold trap 27 to remove impurities. Following passage through the cold trap the gases are delayed in a length of wide diameter tubing 29 in order to permit the gases to return to ambient temperature prior to flowing through detector $D_1$, typically comprising a thermal conductivity cell, which forms part of a conventional Wheatstone bridge circuit. This bridge circuit is connected to a suitable measuring device M, as indicated.

After leaving the first detector $D_1$, the gas stream flows through a four-way valve 30 which is selectively operable to allow the gas mixture to flow either through a known volume 32 or to by-pass such known volume. In this manner a known quantity of a predetermined gas mixture can be isolated and can subsequently be swept out of the known volume so as to be operative at that time for calibration purposes.

After leaving the first four-way valve 30, the gas mixture reaches another four-way valve 34 which is selectively operable to direct the flow either through the cell 36, containing a powder sample, or in such a way as to by-pass the sample cell.

It will be noted that a pressure gauge 38 is included in the system. This gauge serves two purposes. It will indicate, when valve 40 is open, the pressure over the sample powder due to the down stream impedance. Also, it will serve to measure the equilibrium vapor pressure, $P_o$, of the adsorbate. This latter measurement is made by purging the entire system with the adsorbate. Thus, with the sample cell 36 immersed in a coolant (e.g. liquid nitrogen) contained in a flask 42, valve 44 is closed and pressure is allowed to build up in the system in order to liquefy the adsorbate in the sample cell. Four-way valve 34 is then turned so as to isolate the sample cell 36 and valve 44 is opened to relieve pressure in the system. Valves 40 and 46 are opened and liquid adsorbate will commence to boil, whereby the vapor will flow through gauge 38 to purge it. Then valve 46 is closed and gauge 38 will indicate the saturated equilibrium vapor pressure, $P_o$ of the adsorbate. This operation of obtaining the saturated vapor pressure is similar to that already disclosed in copending application 828,565, filed May 28, 1965, and assigned to the assignee of this application. As a result of obtaining the saturated vapor pressure in this manner, much greater accuracy is obtainable in determining surface areas.

It will be seen in the system of FIG. 1 that equilibration coil 48 is located immediately following the sample cell 36. This coil serves to permit the gases to return to ambient temperature prior to reaching detector $D_2$. Flow meter 50 indicates the flow through the system down stream of the vent. A conventional bubble meter 52, following detector $D_2$, is used to measure the flow rate.

The operation of the system of FIG. 1 will now be explained with reference to Equation I, the system depicted in FIG. 1 having been designed to implement the concept which is expressed mathematically:

$$V_{ads_n} = \left( \frac{A_{total} \times V_{cal}}{A_{cal_{n-1}}} - V_{cell} \times \frac{TR}{TB} \right) P_{n-1}$$

(Equation I)

$P_{n-1}$ is equal to $L_{he} \times (S_{n2}/S_{he}) - L_{n2}$ where:

$L_{he}$ is fractional pressure of helium in calibrating loop $L_{n2}$ is fractional pressure of nitrogen in calibrating loop $S_{n2}$ is fractional pressure of nitrogen in flow through sample cell $S_{he}$ is fractional pressure of helium in flow through sample cell.

Figure 5:
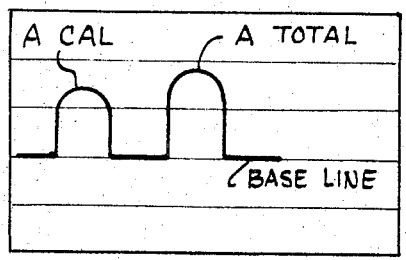
FIG. 5 illustrates a typical set of signals obtained on a recorder, such signals being used to determine the amount of adsorbate adsorbed.

When constructing the adsorption isotherm it is necessary to obtain several data points in order to construct the correct curve. Each data point is obtained with a different nitrogen pressure, this pressure being determined by the appropriate setting of the flow control valves 14 and 16. Let $n$ be any gas mixture employed; then $n-1$ is the previous gas mixture employed. The term $V_{ads_n}$ is the amount of nitrogen adsorbed from the $n$th mixture. Now, assuming the use of a recording potentiometer or the like as the measuring device M, $A_{total}$ is the total signal area generated when the $n$th mixture is used to flush the $n-1$ mixture out of the sample cell 36 (see FIGS. 1 and 5). This signal area, however, is a consequence of the detector sensing the concentration change due to the flushed volume as well as adsorption from the $n$th mixture. $V_{cal}$ is the known volume 32 which can be isolated by the four-way valve 30. $A_{cal_{n-1, n}}$ is the signal area generated when the $n-1$th mixture is purged from this known volume, by the operation of such valve to a position such that the $n$th mixture flows through the known volume tube.

As an example, let certain specific values be considered. First, with the sample immersed in the coolant, helium gas is used to purge the entire system and by use of valves 30 and 34 helium is respectively isolated in calibration volume 32 and in sample cell 36. Then the flow is adjusted to obtain a relative pressure of nitrogen of 0.1. The system is purged with the new mixture except for the calibration volume 32 and the sample cell 36. When the recorder arrives at a constant base line, valve 30 is turned to permit the new mixture ($n$) to flush out of the known volume 32 the old mixture ($n-1$), which in this case happens to be pure helium. After this calibration signal ($A_{cal_{n-1,n}}$) has been recorded, valve 30 is returned to its original position thereby isolating mixture $n$ and valve 34 is opened permitting the new mixture ($n$) to flush out from the sample cell the old mixture ($n-1$). When the recorder returns to the base line, valve 34 is returned to its original position thereby isolating mixture ($n$) in the sample cell. A new mixture ($n+1$) is then established using the flow control valves 14 and 16, and this mixture is used to flush out from the calibration volume and the sample cell the $n$th mixture in a manner similar to the way in which the $n$th mixture was used to flush out the $n-1$th mixture. This process is continued in suitable incremental steps until pure nitrogen is used to flush a previous mixture which is slightly less than pure.

By incrementally decreasing the nitrogen concentration and following the same procedure outlined above, the isotherm can be reconstructed in a series of desorption steps. Thus, as a result of gradually decreasing the nitrogen pressure a hysteresis portion is observed, as can be seen by reference to FIG. 4. Above the point of convergence the values of nitrogen adsorbed are greater for a given pressure of nitrogen.

As mentioned earlier, when the electrical signals representative of changes in gas concentration are recorded, it becomes necessary to separate the total signal area ($A_{total}$) into its representative parts. In order to do this, the second term in the parenthesis of Equation I, i.e.

$$V_{cell} \times \frac{TR}{TB}$$

must be evaluated. $V_{cell}$ is the cell volume enclosed by valve 34. When multiplied by $TR/TB$ (TR=room temperature and TB=bath temperature) the complete term, $$V_{cell} \times \frac{TR}{TB}$$

is equal to the volume of gas enclosed by valve 34 after it has been flushed from the cell and allowed to warm up to room temperature. When this volume is subtracted from the first volume in the parenthesis of Equation I, the net volume is that quantity of adsorbate adsorbed in the increment between the $n-1$th and the $n$th mixture. Both terms within the parentheisis in Equation I are multiplied by partial pressure $(P_{n-1})$ to give the correct signal. When adsorption is taking place, the term $P_{n-1}$ is used and when desorption is taking place, the term $-P_{n-1}$ is used.

In order to properly measure the term $$V_{cell} \times \frac{TR}{TB}$$

the cell while immersed in the coolant is purged with carrier gas, as is the calibration volume. Then the rest of the system is purged with pure adsorbate; that is, while the known volume 32 and the sample cell 36 are isolated from the rest of the system by operation of valves 30 and 34, respectively. Following this operation, the carrier gas is flushed out of the calibration volume and a first signal area is obtained on the measuring device M. Then the adsorbate is admitted into the sample cell and the coolant is essentially simultaneously removed from the sample cell. In this manner the carrier gas is flushed from the sample cell with no associated adsorption of the adsorbate. The second signal area resulting from this latter operation ($A_{cell}$), and the first signal area obtained by flushing the calibration volume ($A_{cal}$) gives the term $$V_{cell} \times \frac{TR}{TB}$$

in accordance with the following equation, $V_{cal}$ being known:

$$V_{cell} \frac{TR}{TB} = \frac{V_{cal}}{A_{cal}} A_{cell}$$

(Equation II)

Figure 4:
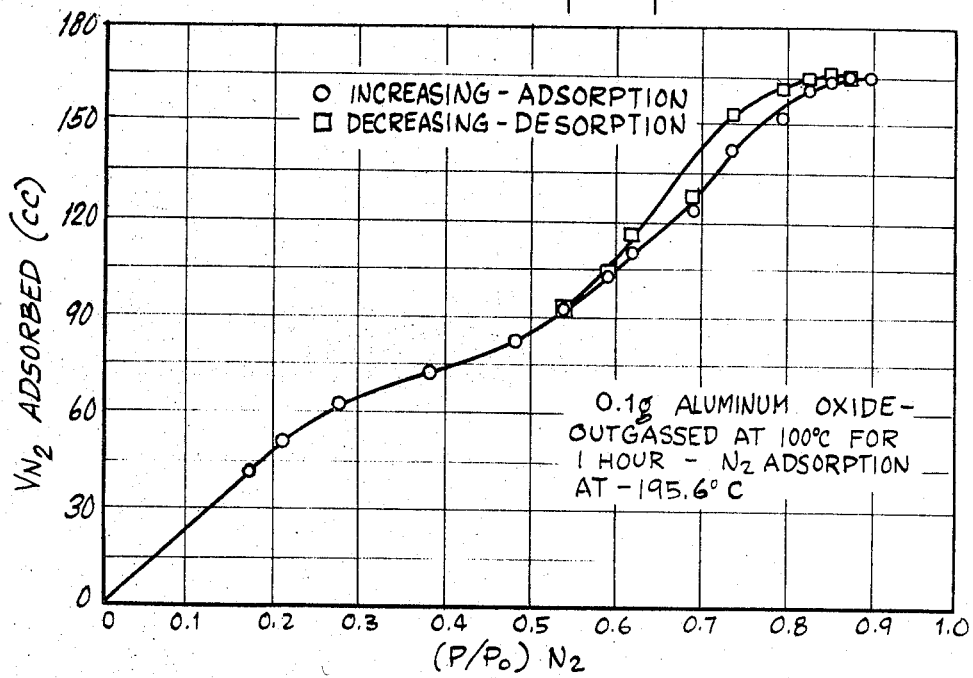
FIG. 4 is a graph depicting a selected isotherm, according to which the relative pressure of the adsorbate is plotted against the amount of adsorbate actually adsorbed.

In order to provide an example of the results obtained by the practice of the incremental method of the present invention, reference may be made to the following table:

with the values plotted in the graphs of FIG. 4. It is well known that from the data in the table the surface area and pore size distribution can be fully evaluated.

Referring now to FIG. 2, there is depicted an alternate embodiment for the apparatus of the present invention. This system is very similar to the system of FIG. 1 already described. Its chief difference lies in the fact that in accurately determining the volume of adsorbate adsorbed ($V_{ads}$), this system uses a calibration scheme very similar to that already disclosed in copending application 828,565. In accordance with the scheme independent lines 100 and 102 for the carrier gas and the adsorbate are connected to the main supply lines, and suitable valves 104, 106 and 108 are provided to enable control of the carrier and adsorbate gases, as these are to be supplied to a calibration valve 30a. This calibration valve is so arranged that, as indicated by the single and double dotted lines, the mainstream passing from the detector $D_1$ may be connected directly to the sample cell, or in the other position, the mainstream will be connected by way of the sample volume 32a to the sample cell 36. In the position of the valve allowing for direct flow, the sample volume 32a is then connected to the auxiliary supply from line 110, whereas in the alternative position the auxiliary supply may be vented to the atmosphere.

For purposes of calibration either pure helium or pure hydrogen is brought in by operation of the appropriate valves via line 110 into the calibration volume 32; then, in obtaining the value for the volume of nitrogen adsorbed by the sample, the following equation is used:

$$V_{ads_n} = \left( \frac{A_{total} \times V_{cal}}{A_{cal}} - V_{cell} \times \frac{TR}{TB} \times P_{n-1} \right)$$

(Equation III)

$P_{n-1}$ is equal to $L_{he} \times (S_{n2}/S_{he}) - L_{2n}$ where:

$L_{he}$ is fractional pressure of helium in calibrating loop
$L_{n2}$ is fractional pressure of nitrogen in calibrating loop
$S_{n2}$ is fractional pressure of nitrogen in flow through sample cell
$S_{he}$ is fractional pressure of helium in flow through sample cell.

When adsorption is taking place, the term $P_{n-1}$ is used, and when desorption is taking place, the term $-P_{n-1}$ is used.

TABLE

[0.1 gram Aluminum Oxide ($Al^2O^3$) Outgassed for 1 hour at 100° C.]

| Flow He, ml./min. | Flow N₂, ml./min. | $P_{He}$ atm. | $PN_2$ atm. | $A/A_{cal}$ $V_{cal} \cdot P_{n-1}$ | $V_{cell}/$ $TR/TB$ $P_{n-1}$ | $V_{ads}$ | $\Sigma V_{ads}$ |
|---|---|---|---|---|---|---|---|
| 75.0 | 15.5 | .829 | .171 | 62.3 | 23.3 | 39.0 | 39.0 |
| 70.5 | 19.0 | .788 | .212 | 31.4 | 19.3 | 12.1 | 51.1 |
| 55.0 | 20.5 | .728 | .272 | 29.8 | 18.3 | 11.5 | 62.6 |
| 44.0 | 27.5 | .615 | .385 | 27.4 | 17.0 | 10.4 | 73.0 |
| 40.0 | 33.0 | .519 | .481 | 24.5 | 14.3 | 10.3 | 83.2 |
| 35.0 | 39.5 | .470 | .530 | 22.1 | 12.1 | 10.0 | 93.2 |
| 35.0 | 51.0 | .407 | .593 | 20.5 | 10.9 | 9.60 | 102.8 |
| 35.0 | 58.0 | .376 | .624 | 17.2 | 9.48 | 7.73 | 110.5 |
| 26.0 | 58.0 | .310 | .690 | 23.2 | 8.76 | 14.4 | 124.9 |
| 26.0 | 74.0 | .260 | .740 | 24.4 | 7.22 | 17.2 | 142.1 |
| 19.0 | 74.0 | .204 | .796 | 15.6 | 6.05 | 9.55 | 151.7 |
| 16.0 | 74.0 | .178 | .822 | 12.8 | 4.75 | 8.05 | 159.7 |
| 13.0 | 74.0 | .149 | .851 | 8.89 | 4.15 | 4.74 | 164.5 |
| 13.0 | 91.0 | .125 | .875 | 4.25 | 3.47 | 0.78 | 165.2 |
| 11.0 | 91.0 | .108 | .892 | 3.18 | 2.91 | 0.27 | 165.5 |
| 13.0 | 91.0 | .125 | .875 | 2.65 | 2.51 | 0.14 | 165.4 |
| 13.0 | 74.0 | .149 | .851 | 3.08 | 2.91 | 0.17 | 165.2 |
| 16.0 | 74.0 | .178 | .822 | 5.21 | 3.47 | 1.74 | 163.5 |
| 19.0 | 74.0 | .204 | .796 | 6.29 | 4.15 | 2.14 | 161.3 |
| 26.0 | 74.0 | .260 | .740 | 11.6 | 4.75 | 6.85 | 154.5 |
| 26.0 | 58.0 | .310 | .690 | 33.2 | 6.05 | 27.1 | 127.3 |
| 35.0 | 58.0 | .376 | .624 | 28.8 | 7.22 | 11.6 | 115.7 |
| 35.0 | 51.0 | .407 | .593 | 21.4 | 8.76 | 12.6 | 103.1 |
| 35.0 | 39.5 | .470 | .530 | 19.3 | 9.48 | 9.8 | 93.3 |
| 40.0 | 33.0 | .519 | .481 | | | | |
| 44.0 | 27.5 | .615 | .385 | | | | |

This table indicates the various parameters employed, i.e. the type and quantity of material, the various flow rates and pressures of the several gases and the values for the various terms of Equation I. Also shown in the table is the accumulative total of $V_{ads}$, which correspond It is necessary in the operation of the technique of the present invention using the equations already discussed that the volume of the sample cell which is below the level of the coolant in the flask be maintained constant. Therefore, it is necessary that means be provided for insuring that, despite the fact that evaporation of the liquid coolant will take place, the volume of the cell which is immersed remains constant. This is accomplished by the mechanism shown in detail in FIG. 3, such mechanism being operative automatically to raise the Dewar flask so that the established level is maintained. A sensing means 112 includes a plastic float 114 to which is attached a rod 116 which projects through a guide 118 formed in a cover 120 disposed over the top of the Dewar flask. At the other end of the rod 116 a magnetic element 122 is provided which is operative to affect a reed switch 124 connected in a circuit including a power supply 126 and a relay coil 128. The relay coil, when deenergized, closes the circuit of motor 130 which is effective, through a suitable drive arrangement, to lift the flask 42. In the operation of the level control mechanism, when the level of the coolant of the flask 42 drops due to evaporation, the descent of the float 114 causes opening of the contacts of the reed switch with the eventual result that the motor 130 is energized to cause the flask 42 to move upwardly until the float 114 rises sufficiently to close the contacts of switch 124, thereby to de-energize motor 130.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:
1. A method for determing surface characteristics of solid materials comprising passing a gaseous mixture of an adsorbate and a relatively, non-adsorbable carrier gas over a sample of solid material at a temperature at which adsorption of the adsorbate takes place and at a predetermined flow rate for each of the gases; varying the relative pressure of the adsorbate in slight increments to produce increasing amounts of adsorption, without immediately desorbing, thereby to provide the adsorption isotherm, and thereafter to produce decreasing amounts, thereby to provide the desorption isotherm; the step of varying the relative pressure being carried out by varying the flow rates of the individual gases, while holding the total pressure always substantially at atmospheric.

2. A method as defined in claim 1, further characterized in the steps of detecting a change in concentration in the gas flow; isolating the sample cell from said predetermined mixture; establishing a new concentration of adsorbate in the flow; connecting the cell to the mainstream having the new concentration of adsorbate; flushing out the former mixture from said cell while adsorbing adsorbate from the new mixture; and detecting the new change in concentration.

References Cited

UNITED STATES PATENTS

| | | | |
|---|---|---|---|
| 2,960,870 | 11/1960 | Nelsen et al. | 73—432 |
| 3,211,006 | 10/1965 | Haley, Jr. | 73—432 |
| 3,211,007 | 10/1965 | Atkins | 73—432 |

OTHER REFERENCES

Daeschner, H. W., et al. An Efficient Dynamic Method for Surface Area Determinations, Anal. Chem., vol. 34, pp. 1150–1155, August 1962.

LOUIS R. PRINCE, Primary Examiner

J. W. ROSKOS, Assistant Examiner

U.S. Cl. X.R.

73—38

Certificate

Patent No. 3,555,912  
Patented January 19, 1971

Seymour Lowell

Application having been made by Seymour Lowell, the inventor named in the patent above identified, and Quantachrome Corporation, Greenvale, New York, a corporation of New York, the assignee, for the issuance of a certificate under the provisions of Title 35, Section 256, of the United States Code, adding the name of Stewart Karp as a joint inventor, and a showing and proof of facts satisfying the requirements of the said section having been submitted, it is this 29th day of June 1971, certified that the name of the said Stewart Karp is hereby added to the said patent as a joint inventor with the said Seymour Lowell.

FRED W. SHERLING  
*Associate Solicitor.*